United States Patent
Fayat

(10) Patent No.: US 6,467,776 B1
(45) Date of Patent: Oct. 22, 2002

(54) DEVICE FOR TILT CORRECTION OF A TWO AXLES PLATFORM

(75) Inventor: Jean-Claude Fayat, Paris (FR)

(73) Assignee: Bobcat France S.A., Pontchateau (FR)

( * ) Notice: Subject to any disclaimer, the term of this patent is extended or adjusted under 35 U.S.C. 154(b) by 0 days.

(21) Appl. No.: 09/640,866

(22) Filed: Aug. 18, 2000

(51) Int. Cl.[7] ............................................. B62D 37/00
(52) U.S. Cl. .................. 280/6.15; 280/6.153; 280/6.154
(58) Field of Search ............................. 280/6.15, 6.153, 280/6.154, 6.156, 6.157, 754

(56) References Cited

U.S. PATENT DOCUMENTS

| | | | | |
|---|---|---|---|---|
| 3,703,298 A | * | 11/1972 | Laverda | 280/2 H |
| 3,712,675 A | * | 1/1973 | Schoenwald | 280/6.153 |
| 4,152,004 A | * | 5/1979 | Schroder | 280/6.154 |
| 4,161,322 A | * | 7/1979 | Ekeborg et al. | 280/6.154 |
| 5,085,042 A | * | 2/1992 | Lansdowne | 56/6 |
| 5,447,331 A | * | 9/1995 | Barnhart | 280/840 |
| 5,813,697 A | * | 9/1998 | Bargenquast et al. | 280/754 |
| 6,007,073 A | * | 12/1999 | Gunter | 280/6.153 |
| 6,196,555 B1 | * | 3/2001 | Gaibler | 280/6.154 |

* cited by examiner

Primary Examiner—Jack Lavinder
Assistant Examiner—Mariano Sy
(74) Attorney, Agent, or Firm—Nixon Peabody LLP; David S. Safran

(57) ABSTRACT

A superelevation correction device for a platform with two axles. The platform, comprising a chassis (1) on which the axles (2, 3) are articulated, the device comprising at least one first one first jack (6) articulated between the front axles (2) and the chassis (1) and at least one second jack (7) articulated between the rear axles (3) and the chassis (1), the two jacks being connected in parallel to the same control circuit (12), the jacks being of the double-acting type.

11 Claims, 1 Drawing Sheet

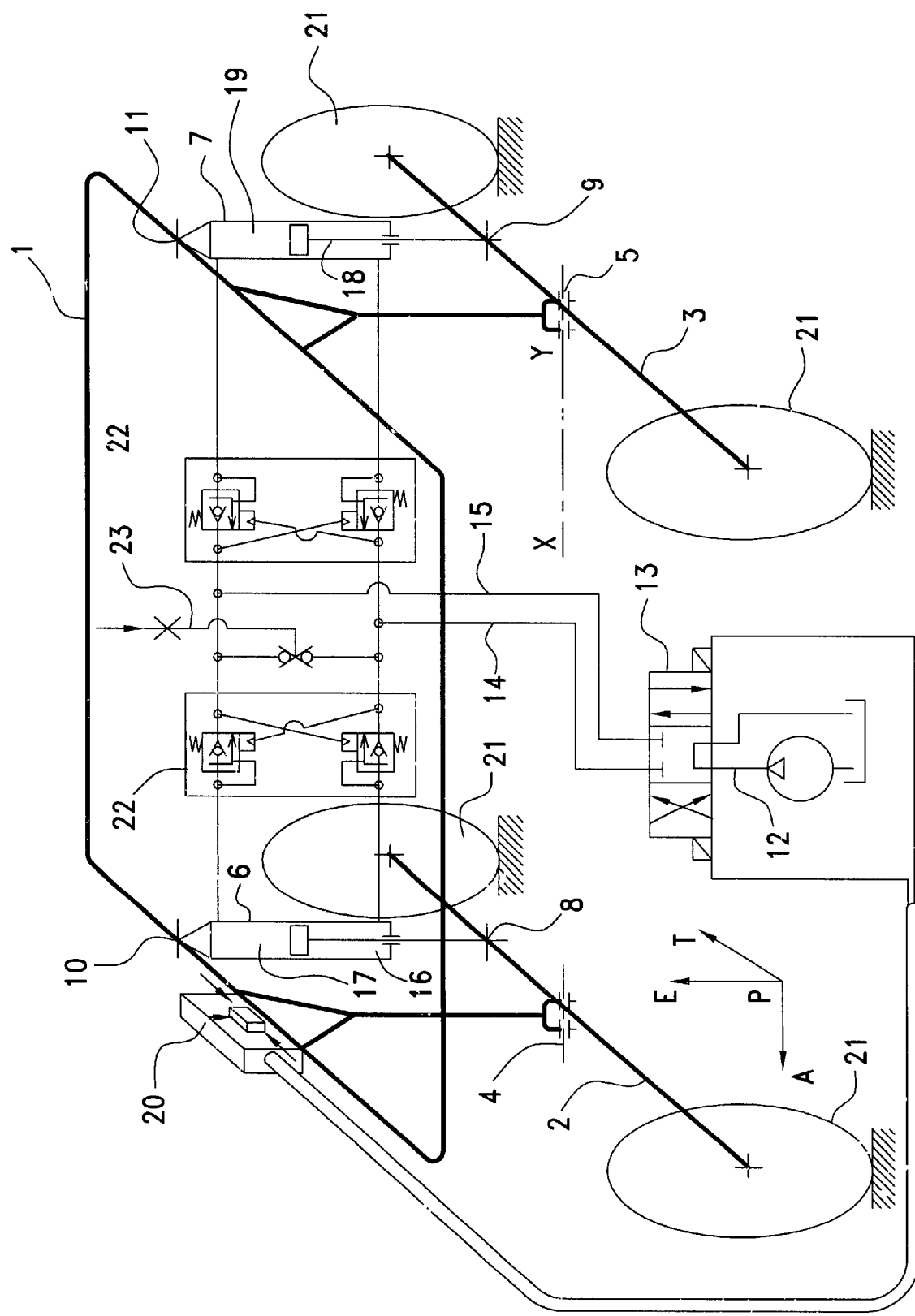

DEVICE FOR TILT CORRECTION OF A TWO AXLES PLATFORM

The invention relates to the technical field of platforms with two axles, self-propelled or otherwise, provided with a manual or automatic superelevation control.

The invention therefore concerns in particular, but not exclusively, power lift trucks of the type comprising at least a single telescopic arm, articulated in the rear half of the chassis.

Many designs of such trucks are already known in the prior art.

Reference can be made, by way of example, to the following documents:

WO-A-97/46478, WO-A-89/00972;

EP-A-0 692 448, EP-A-0 680 923, EP-A-0 656 315, EP-A-0 577 388, EP-A-0 543 276, EP-A-0 504 527, EP-A-0 433 244, EP-A-0 410 082, EP-A-0 325 064;

FR-A-2 725 191, FR-A-2 713 155, FR-A-2 624 842, FR-A-527 992;

U.S. Pat. No. 5,478,192, U.S. Pat. No. 5,198,861, U.S. Pat. No. 5,106,257, U.S. Pat. No. 4,964,778, U.S. Pat. No. 4,553,899, U.S. Pat. No. 3,937,339.

For some of these power trucks, different structures are known in the prior art, allowing the control of superelevation, manual or automatic.

For example, the document U.S. Pat. No. 3,937,339 describes a truck provided with two superelevation control jacks, disposed substantially at 90° with respect to each other between the chassis and the front axle, an attitude measuring system allowing control of the said jacks.

The known superelevation correction systems of the prior art make it possible to maintain a suitable attitude for a four-wheel platform such as a lift truck only imperfectly.

Such is in particular the case for machines for which only one axle is swinging, the other axle being fixed.

The invention relates to a superelevation control system for a platform with two axles which does not have the drawbacks of the prior systems and also makes it possible to reduce the inclination of this platform when passing by obstacles.

To this end, the invention relates, according to a first aspect, to a superelevation correction device for a platform with two axles, the said platform comprising a chassis on which the axles are articulated, the said device being characterised in that it comprises at least one first jack articulated between the front axle and the chassis and at least one second jack articulated between the rear axle and the chassis, the two jacks being connected in parallel to the same control circuit.

According to other characteristics taken along or in combination:

the areas where the first and second jacks are articulated on the axles are situated at a distance substantially equal to the longitudinal centre axis of the platform;

the first and second jacks lying at two equal angles with respect to the vertical;

the first and second jacks lie at an angle of less than 45° with respect to the vertical;

the chassis is articulated on the axis through two articulation areas disposed substantially half-way across the said axis;

first and second jacks are of the double-acting type;

the jack control circuit comprises a double-acting solenoid valve;

the control circuit comprises two double balancing valves (or controlled valve), ensuring safety in the event of rupture of a hose or overpressure. These valves are kept open in normal operation through a booster pressure supply (23);

the control circuit comprises a level detector or a switch.

The invention relates, according to a second aspect, to the application of a device as presented above to the correction of superelevation on lift trucks, the lift truck being in particular of the type with a telescopic arm articulated on the rear of the chassis.

Other objects and advantages of the invention will emerge from the following description of embodiments with reference to the accompanying drawing.

BRIEF DESCRIPTION OF THE DRAWING

The sole FIGURE of the drawing is a schematic perspective view of a superelevation control system according to the invention fitted to a platform with four wheels.

DETAILED DESCRIPTION OF THE INVENTION

The platform is depicted, for the purposes of simplification, on a substantially horizontal ground.

The superelevation control system is shown diagrammatically in the neutral position, that is to say not causing a superelevation of the chassis 1 of this platform.

The chassis 1 is depicted in the FIGURE by a flat plate outline.

As a person skilled in the art will understand, the shape of the chassis can in fact be very variable, the superelevation control system for a platform with two axles being able to be set up for machines of very variable types, including in particular but not exclusively lift trucks.

Each axle supports at least two wheels in the embodiment depicted.

To simplify, the platform will be assumed to have four wheels.

The four wheels or only two of them can be driven.

The four wheels or only two of them can be steering.

Two axles 2, 3 are mounted articulated on the chassis 1.

For simplification, the chassis 1 will be assumed to be depicted so that its forward travel corresponds to the direction A in the FIGURE.

It should however be understood that the superelevation correction system is symmetrical and that the forward travel of the chassis could correspond to the opposite direction to direction A.

This direction of travel A will be referred to as longitudinal.

A transverse direction T, at right angles to direction A, defines with the latter a plane P, an elevation direction E, perpendicular to this plane P, forming with the directions A and T a direct trihedron.

The terms "length", "front" and "rear" will be employed with reference to the first direction A.

The terms "widths", "left" and "right" will be employed with reference to the second direction T.

The terms "heights" and "thicknesses" will be employed with reference to the third direction E.

The front axle 2 is articulated on the chassis 1 at an area 4 corresponding substantially to half-way across its width.

Likewise the rear axle 3 is articulated on the chassis 1 at an area 5 corresponding substantially to half-way across its width.

The front axle 2 is also connected to the chassis 1 by a jack 6.

Likewise the rear axle 3 is connected to the chassis by a jack 7.

The two jacks 6, 7 lie, in the embodiment depicted, substantially parallel to each other in the direction E, and are articulated on their respective axles 2, 3 at respective articulation areas 8, 9 that are situated toward the same side of the chassis substantially at the same distance from the longitudinal center axis XX of the platform.

The two jacks 6, 7 are also articulated on the chassis 1 at articulation areas 10, 11 placed, in the embodiment depicted, vertically in line with the areas 8, 9 where the jacks are articulated on the axles 2, 3.

In other embodiments, not shown, the jacks 6, 7 are not vertical but inclined by an identical angle with respect to the elevation direction E, an angle lying between a few degrees and 45° with respect to the elevation direction E.

The jacks can be of the hydraulic, pneumatic, oil-hydraulic or oil-pneumatic type.

The rods of the jacks 6, 7 can be oriented towards the chassis 1 or conversely towards the axles 2, 3.

In one embodiment, the jacks are of the double-acting type.

The jacks 6, 7 are connected in parallel to a control circuit 12.

In one embodiment, the control circuit comprises a double-acting solenoid valve 13 connected by two lines 14, 15 to the two chambers 16, 17, 18, 19 of each of the jacks 6, 7.

The solenoid valve 13, in one embodiment, is controlled by a pendulum or switch 20, so that the chassis 1 of the platform can be kept substantially horizontal, within a certain range of profiles across the ground over which the platform travels.

Communication between the four chambers 16, 17, 18, 19 of the jacks 6, 7 ensures that the four wheels 21 of the platform are kept in abutment on the ground to a better extend compared with the devices known previously.

The control circuit 12 comprises two balancing valves 22 or double controlled valves, ensuring safety in the event of rupture of a hose or overpressure.

These valves 22 are kept open in normal operation by a booster pressure supply 23.

Compared with a conventional superelevation correction device, in which only one of the axles is swinging, the system described above makes it possible to reduce the inclination of the chassis by a factor of two.

What is claimed is:

1. A superelevation correction device for a platform with two axles, the platform comprising a chassis (1) on which the axles (2, 3) are articulated, the device comprising only one first jack (6) articulated between the front axle (2) and the chassis (1), the articulation between the first jack and the front axle being at a portion of the front axle displaced from the center of the axle toward a first side of the chassis, only one second jack (7) articulated between the rear axle (3) and the chassis (1), the articulation between the second jack and the rear axle being at a portion of the rear axle displaced from the center of the axle toward said first side of the chassis, and a control circuit, the two jacks being connected in parallel to the control circuit (12).

2. A device according to claim 1, characterised in that the areas at which the first and second jacks (6, 7) are articulated on the axis (2, 3) are situated at a distance substantially equal to the longitudinal centre axis of the platform.

3. A device according to claim 1, characterised in that the first and second jacks (6, 7) lie at two equal angles with respect to the vertical.

4. A device according to claim 3, characterised in that the first and second jacks lie at an angle of less than 45° with respect to the vertical.

5. A device according to claim 1, wherein the chassis (1) is articulated on the axle (2, 3) by two articulation areas (4, 5) disposed substantially half-way across the axles (2, 3).

6. A device according to claim 1, wherein the first and second jacks (6, 7) are of a double-acting type.

7. A device according to claim 1, characterised in that the jack control circuit comprises a double-acting solenoid valve (13).

8. A device according to claim 1, wherein the jack control circuit comprises two double balancing valves (22).

9. A device according to claim 1, characterised in that the control circuit comprises a level detector (20) or a switch.

10. A superelevation correction device for a lift truck having a platform with two axles, the platform comprising a chassis on which the axles are articulated, the device comprising only one first jack articulated between the front axle and the chassis, the articulation between the first jack and the front axle being at a portion of the front axle displaced from the center of the axle toward a first side of the chassis and one second jack articulated between the rear axle and the chassis, the articulation between the second jack and the rear axle being at a portion of the rear axle displaced from the center of the axle toward said first side of the chassis, and the one first and second jacks being connected in parallel to a same control circuit.

11. An application according to claim 12, wherein the lift truck has a telescopic arm, articulated on the rear of the chassis (1).

* * * * *